US011928979B2

(12) United States Patent
Reinquin

(10) Patent No.: US 11,928,979 B2
(45) Date of Patent: Mar. 12, 2024

(54) SYSTEMS AND METHOD FOR COLLISION AVOIDANCE BETWEEN AIRCRAFT OR SHIPS

(71) Applicant: AIRBUS DEFENCE AND SPACE SAS, Toulouse (FR)

(72) Inventor: Philippe Reinquin, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 16/976,870

(22) PCT Filed: Mar. 4, 2019

(86) PCT No.: PCT/FR2019/050482
§ 371 (c)(1),
(2) Date: Aug. 31, 2020

(87) PCT Pub. No.: WO2019/166748
PCT Pub. Date: Sep. 6, 2019

(65) Prior Publication Data

US 2020/0410879 A1 Dec. 31, 2020

(30) Foreign Application Priority Data

Mar. 2, 2018 (FR) ..................................... 18 51844

(51) Int. Cl.
*G06G 7/76* (2006.01)
*G08G 3/02* (2006.01)
(Continued)

(52) U.S. Cl.
CPC ................. *G08G 9/02* (2013.01); *G08G 3/02* (2013.01); *G08G 5/0082* (2013.01); *G08G 5/04* (2013.01)

(58) Field of Classification Search
None
See application file for complete search history.

(56) References Cited

U.S. PATENT DOCUMENTS 4,812,990 A 3/1989 Adams et al.
6,424,889 B1 * 7/2002 Bonhoure ............ G05D 1/0202 701/13

(Continued)

OTHER PUBLICATIONS

French Search Report for French Application No. 1851844 dated Jan. 25, 2019, 12 pages.

(Continued)

*Primary Examiner* — Adam D Tissot
*Assistant Examiner* — Michael T Silva
(74) *Attorney, Agent, or Firm* — Nixon & Vanderhye P.C.

(57) ABSTRACT

A device for avoiding a potential conflict detected in a predetermined trajectory prediction horizon between a first trajectory of a first ship or aircraft and a second trajectory of a second ship or aircraft is disclosed. Each trajectory includes a plurality of segments formed between multiple navigation points. The device includes a determination unit for determining at least one lateral peripheral envelope of the first trajectory, a division unit for dividing the lateral peripheral envelope into a plurality of juxtaposed sections arranged longitudinally the ones after the others and delimited by transition lines marking the change between sections, each transition line cutting, at a first point of intersection, a segment of the first trajectory and, at a second point of intersection, and an edge of the lateral peripheral envelope, a discretisation unit, and a computing unit.

12 Claims, 6 Drawing Sheets

(51) Int. Cl.
*G08G 5/00* (2006.01)
*G08G 5/04* (2006.01)
*G08G 9/02* (2006.01)

(56) References Cited

U.S. PATENT DOCUMENTS

| | | | | |
|---|---|---|---|---|
| 6,604,044 | B1 * | 8/2003 | Kirk | G08G 5/045 701/1 |
| 7,194,353 | B1 * | 3/2007 | Baldwin | G08G 5/0039 701/528 |
| 8,090,526 | B2 * | 1/2012 | Marty | G01C 21/00 701/411 |
| 8,825,366 | B2 * | 9/2014 | Giovannini | G08G 5/006 701/411 |
| 9,593,961 | B2 * | 3/2017 | Ramaiah | G08G 5/0021 |
| 9,870,711 | B2 * | 1/2018 | Kang | G08G 5/0026 |
| 10,475,347 | B2 * | 11/2019 | Mere | G08G 5/0034 |
| 2007/0276553 | A1 | 11/2007 | Bitar et al. | |
| 2009/0125221 | A1 * | 5/2009 | Estkowski | G08G 5/045 701/120 |
| 2012/0143487 | A1 * | 6/2012 | Giovannini | G08G 5/0091 701/301 |
| 2013/0124089 | A1 * | 5/2013 | Herman | G01C 21/20 701/528 |
| 2014/0019034 | A1 * | 1/2014 | Bushnell | G01C 23/005 701/122 |
| 2017/0018196 | A1 * | 1/2017 | Shay | G05D 1/0005 |
| 2017/0270808 | A1 * | 9/2017 | Onomura | G01S 13/933 |
| 2017/0365178 | A1 * | 12/2017 | Shay | G08G 5/0034 |

OTHER PUBLICATIONS

English translation and French International Search Report for PCT/FR2019/050482 dated Jul. 16, 2019, 6 pages.
French Written Opinion of the ISA for PCT/FR2019/050482 dated Jul. 16, 2019, 11 pages.

* cited by examiner

SYSTEMS AND METHOD FOR COLLISION AVOIDANCE BETWEEN AIRCRAFT OR SHIPS

CROSS REFERENCE TO RELATED APPLICATIONS

The present application is a National Phase of International Application Number PCT/FR2019/050482 filed Mar. 4, 2019, which designated the U.S. and claims priority benefits from French Patent Application No. FR 18 51844 filed Mar. 2, 2018, the entire contents of each of which are hereby incorporated by reference.

TECHNICAL FIELD

The present invention relates to the field of air or maritime traffic control. More specifically, it relates to systems and methods for assisting in the avoidance of collisions between aircraft or vessels.

PRIOR ART

Knowledge of the navigation plan of an aircraft or a vessel is a valuable aid to both air traffic controllers and maritime traffic controllers. This navigation plan is the responsibility of aircraft pilots or vessel captains. It is also used by control systems to anticipate the movements of the aircraft or vessel and thus to offer services to ensure an optimum level of safety.

In certain situations, it is preferable or even compulsory to deviate from the initial navigation plan. This is the case, for example, when two aircraft or two vessels are detected as being "in conflict". In other words, for aircraft, when their predicted paths show non-compliance with the minimum lateral separation distance or the minimum altitude difference; and for vessels, when their predicted paths show non-compliance with the minimum lateral separation distance.

Resolving a detected conflict between several aircraft or vessels in the best-case scenario consists of ensuring the separations by giving the aircraft or vessels maneuvering instructions, while minimizing the increased length of the path related to the resulting deviations. It has been established that this is an NP-complete problem, namely, a class of problems for which there is currently no polynomial algorithm to solve them.

Computer systems are known for solving this problem using global optimization methods such as genetic algorithms, A* algorithms, or even algorithms using a separation and evaluation process ("branch and bound").

However, it is known that computer systems based on such methods require significant computation time, since the paths of all the aircraft or vessels involved in a conflict must be optimized simultaneously. In very dense traffic, the air traffic controller or the maritime traffic controller often has a very short time to resolve conflicts, only a few minutes.

In addition, computer systems based on such methods can find so-called optimal solutions which greatly disrupt the original traffic of the air or maritime traffic controller. Consequently, the air traffic controller or the maritime traffic controller generally does not use these computer systems which ignore the strategy desired by the controller for the flow of air or maritime traffic.

It is therefore advisable to propose a solution which enables assisting the air traffic controller or the maritime traffic controller in the avoidance of conflicts, in a rapid manner, while enabling the controller to implement a strategy for the flow of air or maritime traffic which is adapted to the current traffic.

SUMMARY OF THE INVENTION

The present invention therefore aims to overcome the above disadvantages.

To do so, in a first aspect of the invention, according to claim 1, the invention provides a device for assisting in the avoidance of a conflict detected within a predetermined path-prediction horizon, between a first path of a first aircraft and a second path of a second aircraft or between a first path of a first vessel and a second path of a second vessel.

Finally, in a second aspect of the invention, according to claim 8, there is provided a method for assisting in the avoidance of a conflict detected within a predetermined path-prediction horizon, between a first path of a first aircraft and a second path of a second aircraft or between a first path of a first vessel and a second path of a second vessel.

BRIEF DESCRIPTION OF DRAWINGS

Other features and advantages of the invention will be better understood by reading the following description and referring to the accompanying drawings, given by way of illustration and in no way limiting.

For clarity, the elements shown are not to scale with respect to one another, unless otherwise stated.

DESCRIPTION OF EMBODIMENTS

The general principle of the invention is based on the fact that in practice, an air traffic controller or a maritime traffic controller in general resolves anomalies in his traffic by seeking to minimize the number of interventions. As such, it should be noted that a conflict, namely a loss of separation distance, between one or more aircraft or vessels constitutes a major anomaly. The objective for a controller in charge of part of the traffic of a volume/area of responsibility is to minimize changes to the traffic. To do this, the search for a solution to a conflict will first and foremost concern the aircraft or vessels considered anomalous. The operator will therefore deal with each anomaly individually while providing solutions for obtaining a generally smooth flow of traffic. In the invention, a solution is proposed which follows this sequential approach, in other words one aircraft or one vessel is processed at a time. As a result, the calculation time will be reduced compared to a global optimization method, since the navigation path of one aircraft or one vessel at a time while is optimized ensuring consistency with the overall traffic. In addition, it is proposed to determine at least one conflict avoidance zone for each aircraft or vessel processed, within which a diversion of the path of the aircraft or vessel enables avoiding the conflict. By using the conflict avoidance zones, the controller chooses between several conflict avoidance paths in order to implement the traffic flow strategy which he considers most suitable for the current traffic. In doing so, the controller has a mechanism to assist with developing a coordinated solution. In addition, if no conflict avoidance zone exists for the aircraft or vessel being considered, the presence or absence of a conflict-free zone information is still communicated to the operator so that he can take this into account in his mental resolution process. Thus, with the invention, the responsibility for separating the aircraft or vessels which are in conflict is ultimately the responsibility of the controller. The strategy applied by the controller thus calls upon his experience, enriched by the tactical analysis carried out by the innovation. This new approach can thus be referred to as "enhanced air or maritime traffic control."

In the description, the invention will be described with reference to the aeronautical sector. However, the invention is also applicable to the maritime sector. In most cases, it will be sufficient to replace the word aircraft with the word vessel and the word air with the word maritime. The main difference between the two fields lies in the conflict detection, which is performed in three dimensions in the air sector and in two dimensions in the maritime sector.

Figure 1:
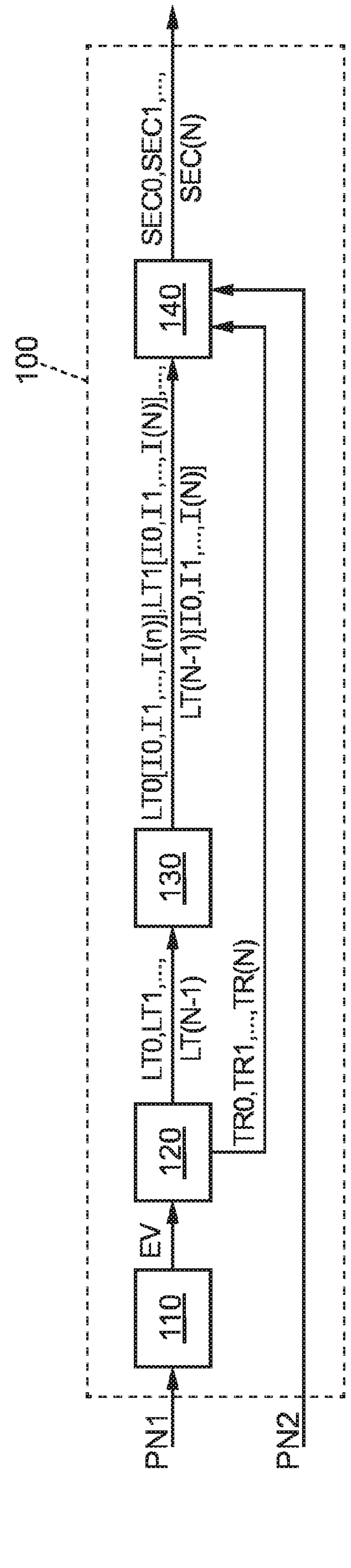
FIG. 1 represents a device according to the invention.

FIG. 1 illustrates a device 100 for assisting in the avoidance of a potential conflict according to the invention. The potential conflict may occur during the en-route or approach phases of flight. It should be noted that the invention can similarly be applied for movement on the ground at the airfield.

The device 100 can be used when a potential conflict is detected by the detection algorithm used, between a first path of a first aircraft and a second path of a second aircraft.

Figure 2:
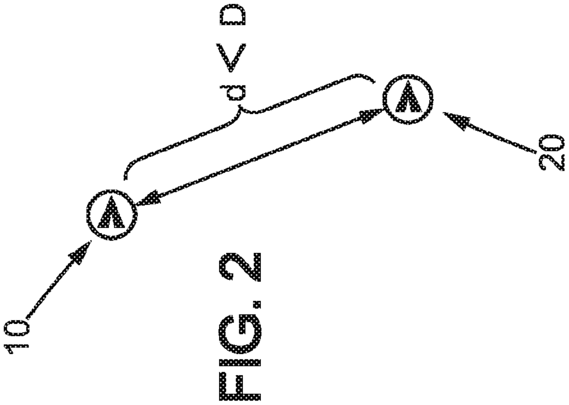
FIG. 2 represents a loss of horizontal separation distance between a first aircraft and a second aircraft.

FIG. 2 shows an example of a loss of separation distance between a first aircraft 10 and a second aircraft 20. In the example of FIG. 2, the positions of the aircraft 10, 20 do not respect a predetermined horizontal separation distance D. In effect, in FIG. 2, the horizontal separation distance d between the paths of the first aircraft 10 and second aircraft 20 is less than the predetermined horizontal separation distance D.

Figure 3:
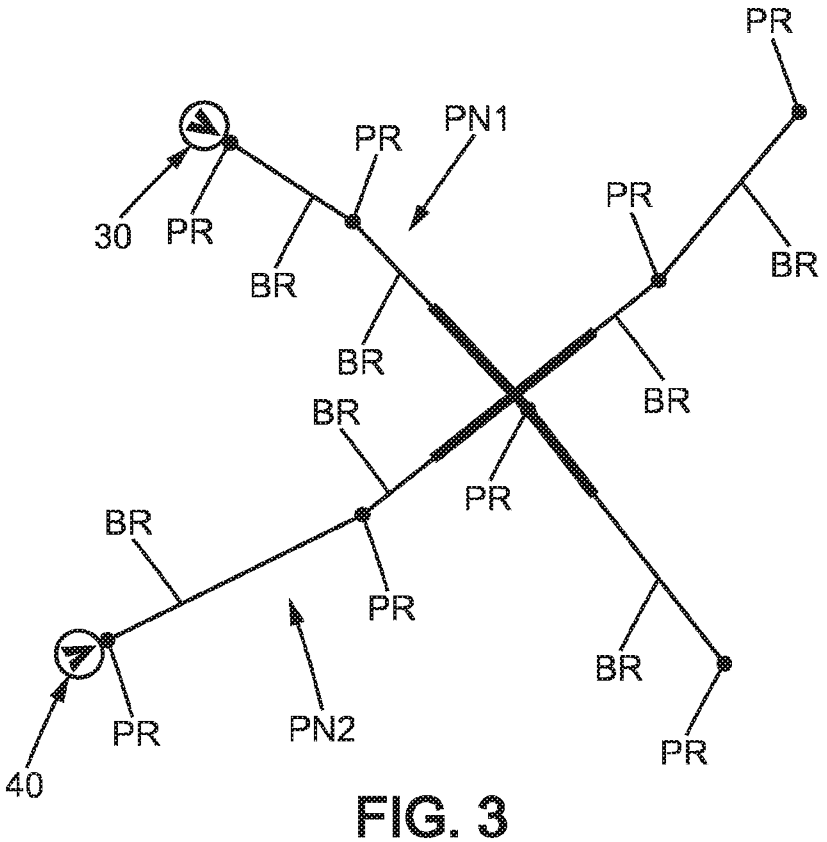
FIG. 3 represents a potential conflict between a first aircraft and a second aircraft.

FIG. 3 shows another example in which a first aircraft 30 is in potential conflict with a second aircraft 40. A potential conflict is defined by the detection of a loss of separation distance based on the predictions of the aircraft paths. In the example of FIG. 3, it is anticipated, within a predetermined path-prediction horizon, that the paths of the aircraft 30, 40 will not respect the predetermined horizontal separation distance. To make the prediction, one can use, for example, the tactical conflict detection tool (TCT for "Tactical Controller Tool") which is specified by the Eurocontrol Experimental Center. This tactical conflict detection service is based on detecting a proximity of two aircraft by comparing positions on the following axes: horizontal, vertical, and time; Tactical detection is therefore a four-dimensional detection. In practice, the predetermined path-prediction horizon is about three to fifteen minutes. Thus, in FIG. 3, the bold lines for the paths of the first aircraft 30 and second aircraft 40 designate portions of the predicted paths where the horizontal separation distance between the paths of the first aircraft 30 and second aircraft 40 will be less than the predetermined horizontal separation distance D, according to the predetermined path-prediction horizon.

The invention applies in particular to FIG. 3 or more generally to cases of detection of potential conflict within a predetermined path-prediction horizon, between a first aircraft 30 and a second aircraft 40. The potential conflict may be detected within the horizontal and/or vertical plane.

Returning to FIG. 3, the first aircraft 30 is associated with a first path PN1 and the second aircraft 40 is associated with a second path PN2. The first path PN1 and the second path PN2 may correspond to a path predicted by extrapolation from the observed behavior of the aircraft or may correspond to a path in accordance with the navigation plan initially filed or requested by the pilot.

In the invention, a path PN1, PN2 may correspond to a portion of a path associated with a control sector. Indeed, it is known that the airspace is divided into control sectors and that each sector is entrusted to one or more air traffic controllers, who are responsible for ensuring the separation of aircraft within this area of the airspace.

In FIG. 3, each path PN1, PN2 comprises a plurality of segments BR, generally rectilinear, which are formed between a plurality of navigation points PR and which laterally connect at the navigation points PR. In the aeronautical field, a navigation point PR is also called a waypoint. In this case, in practice, a navigation point PR has attributes which preferably include latitude, longitude, an identifier of the navigation point PR, and if applicable, the altitude constraint.

In the example of FIG. 3, each path PN1, PN2 comprises three segments BR.

However, the number of segments BR of the first path PN1 may differ from that of the second path PN2. Furthermore, in the example of FIG. 3, each path PN1, PN2 comprises four navigation points PR. For example, it can be seen in FIG. 3 that a navigation point PR is respectively associated with the current position of the first aircraft 30 and of the second aircraft 40. However, the number of navigation points PR of the first path PN1 may differ from that of the second path PN2.

Returning to FIG. 1, the device 100 comprises a determination unit 110, a division unit 120, a discretization unit 130, and a calculation unit 140, which are functionally connected together. In one particular implementation, each of the units of the device 100 consists of at least one processor of known type.

In FIG. 1, the determination unit 110 is configured to determine at least one peripheral lateral envelope of the first path PN1. In the invention, the peripheral lateral envelope defines a lateral navigation surface attainable by the first aircraft 30 from a current position.

In one example, the peripheral lateral envelope is determined based on performance characteristics of the first aircraft 30. For this, one can use the database on aircraft performance (BADA—"Base of Aircraft Data") which is developed and maintained by the Eurocontrol Experimental Center. BADA is a physical model that models the performance of aircraft, among other things, and provides reference values for parameters such as aircraft weight, climb speed profile, or engine thrust. BADA thus allows, at each time increment and depending on the altitude of the aircraft and the flight phase (cruise, climb, or descent), knowing the performance of an aircraft such as speed, fuel consumption, and engine thrust to be applied when calculating the next position.

With BADA, it is therefore possible to calculate the maximum authorized lateral deviation based on the current position of the first aircraft 30. Subsequently, all of this information can be used to determine the peripheral lateral envelope of the invention. Of course, predetermined constraints can be defined to limit the extent of the peripheral lateral envelope according to the requirements of the air traffic controller. For example, a reduction coefficient may be applied to the speed, the fuel consumption, or the engine thrust of the first aircraft 30 as obtained from BADA.

In one particular implementation, the maximum authorized lateral deviation can be calculated from the maximum authorized delay related to the last navigation point PR of the navigation plan PN1. For example, the extent of the peripheral lateral envelope may be limited to the airspace positions which can be reached by the first aircraft 30 but which do not cause a delay of more than five minutes at the last navigation point PR of the navigation plan PN1. Indeed, in the aeronautical field, time management at the last navigation point PR of a sector is important, because the air traffic controller associated with the following sector has already planned the flow of his traffic. Altering traffic to be too early or too late can disrupt the work of the next air traffic controller.

Figure 4A:
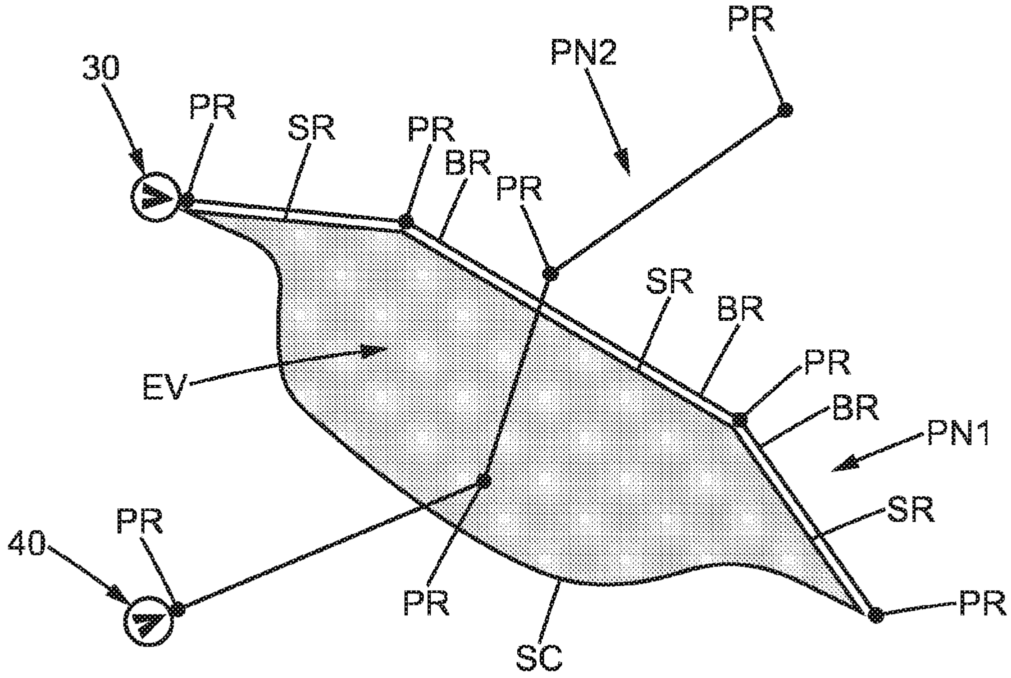
FIG. 4A represents a peripheral lateral envelope according to the invention.

FIG. 4A shows an implementation of FIG. 3 illustrating a peripheral lateral envelope EV of the first path PN1. In the example of FIG. 3, the peripheral lateral envelope EV has an irregular surface comprising a cyclic series of consecutive curved SC and rectilinear SR segments. Each rectilinear segment SR is formed between two consecutive navigation points PR of the first path PN1 while the curved segment SC connects the first and last navigation points PR of the first path PN1. However, one will note that the peripheral lateral envelope EV could have another shape depending on the performance characteristics of the first aircraft 30 and possibly on envelope limitation constraints as mentioned above.

Figure 4B:
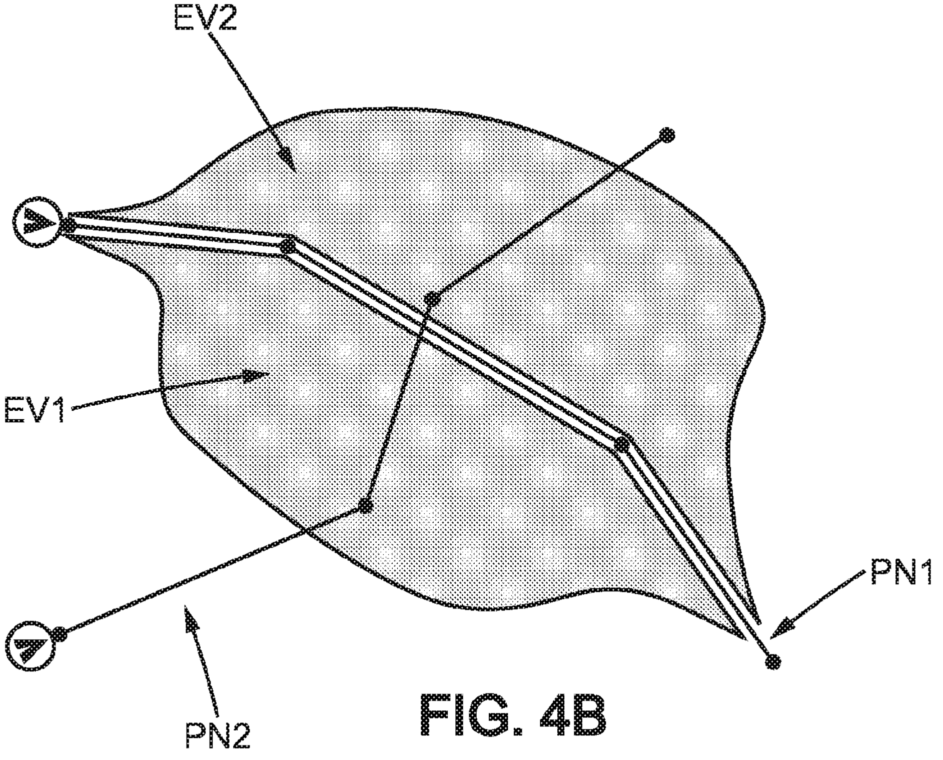
FIG. 4B represents another implementation of the peripheral lateral envelope according to the invention.

FIG. 4B shows another implementation of FIG. 3, in which it is envisaged that the determination unit 110 determines a peripheral lateral envelope on each lateral side of the first path PN1. In the example of FIG. 4B, we can therefore see a right peripheral lateral envelope EV1 of the first path PN1 and a left peripheral lateral envelope EV2 of the first path PN1.

In the following description, we will only consider the implementation of FIG. 4A. For the implementation of FIG. 4B, it is sufficient to use the device 100 in the same manner for the right peripheral lateral envelope EV1 and for the left peripheral lateral envelope EV2.

Returning to FIG. 1, the division unit 120 is configured to divide the peripheral lateral envelope EV into a longitudinal plurality of adjacent sections next to one another. The division unit 120 is also configured to form transition lines marking the change of section, each transition line intersecting a segment of the first path PN1 at a first point of intersection, and an edge of the peripheral lateral envelope EV at a second point of intersection.

Figure 5:
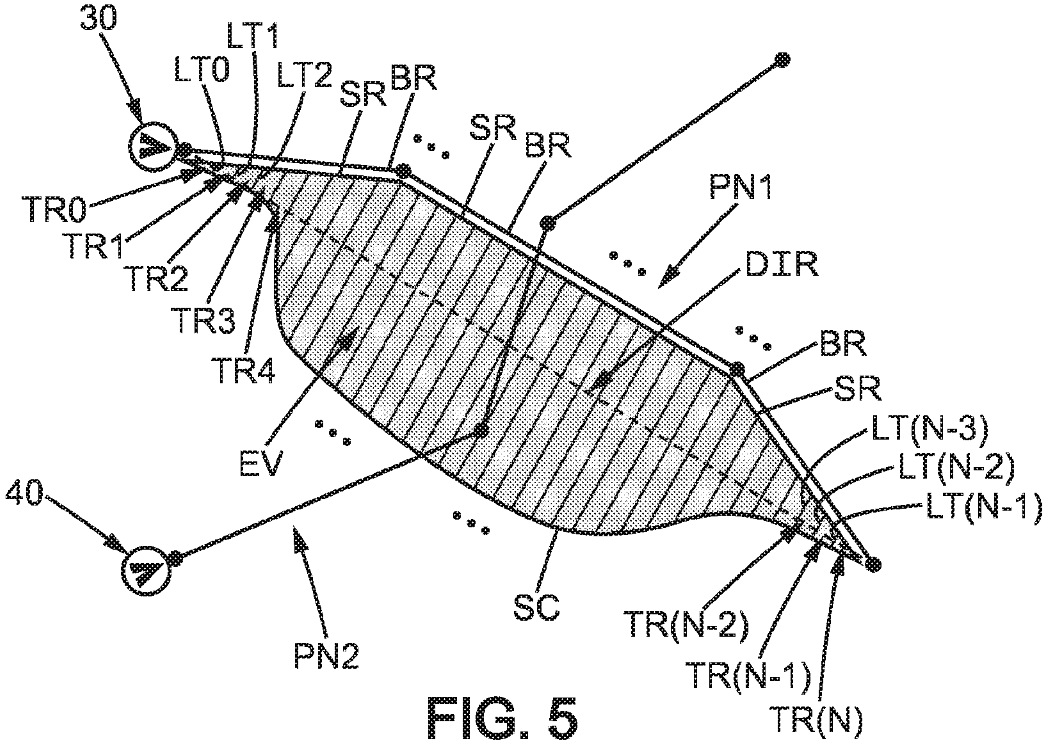
FIG. 5 represents a division of the peripheral lateral envelope of FIG. 4A.

FIG. 5 shows an example of the division of the peripheral lateral envelope EV into a longitudinal plurality of sections TRO, TR1, TR2, . . . , TR(N). In the example of FIG. 5, the sections TR0, TR1, TR2, TR(N) are arranged parallel to one another.

In one particular implementation, the width of each section TR0, TR1, TR2, . . . , TR(N) is determined according to a predetermined time interval. In one example, the following values may be used: 5 seconds, 10 seconds, 15 seconds, or 30 seconds. In another example, the time interval may be determined based on a function which depends on a predetermined parameter associated with the average speed of the first aircraft 30 for reaching a predetermined meeting point. For example, the meeting point may correspond to the exit point of the sector which is the last navigation point PR. In this example, the predetermined parameter is used to adjust the precision and number of the calculations performed.

FIG. 5 also shows the transition lines LT0, LT1, LT2, . . . , LT(N−1). In the example of FIG. 5, the transition lines LT0, LT1, LT2, . . . , LT(N−1) are rectilinear and perpendicular to a straight line DIR connecting the current position of the first aircraft 30 and the last navigation point PR. The straight line DIR defines a direction from the first aircraft 30 to a predetermined meeting point. In the example in FIG. 5, the predetermined meeting point corresponds to the last navigation point PR. However, the meeting point may correspond to any other navigation point considered by the air traffic controller.

Returning to FIG. 5, the transition lines LT0, LT1, LT2, . . . , LT(N−1) intersect the curved segment SC of the peripheral lateral envelope EV on the one hand, and on the other hand, being perpendicular to the straight line DIR, then intersect the rectilinear segments SR of the peripheral lateral envelope EV.

In one particular implementation (not shown), the transition lines LT0, LT1, LT2, . . . , LT(N−1) are curved. For example, the transition lines LT0, LT1, LT2, . . . , LT(N−1) can be arcs for which the center is the first navigation point PR or the current position of the first aircraft 30. However, other navigation points PR can be considered for representing the center of the arcs.

Returning to FIG. 1, the discretization unit 130 is configured to discretize each transition line LT0, LT1, LT2, . . . , LT(N−1) into a plurality of transition points.

Figure 6:
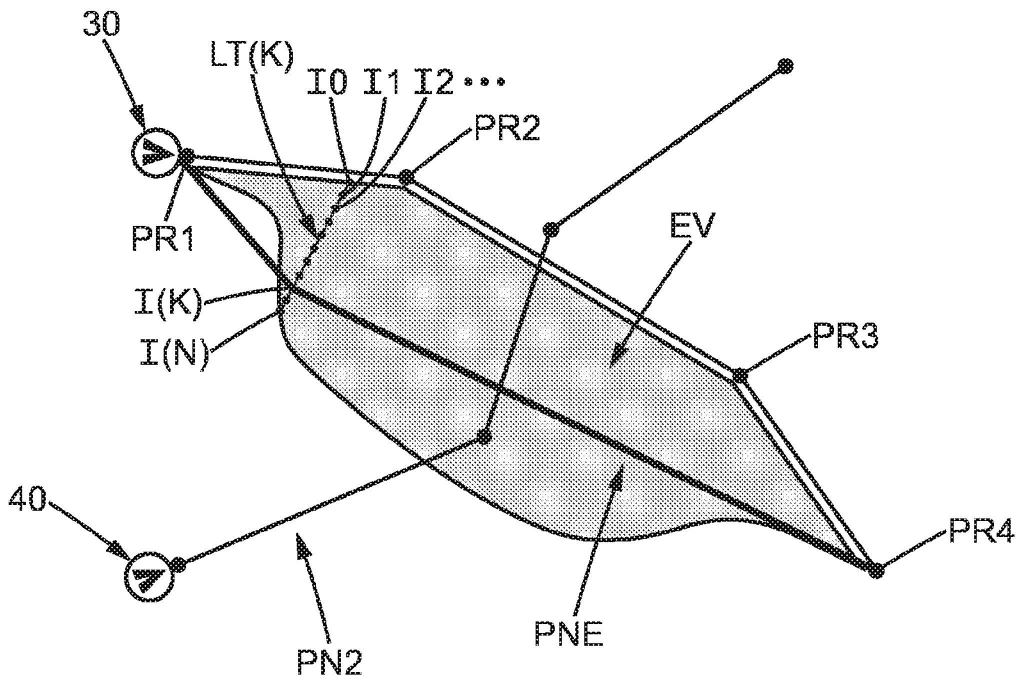
FIG. 6 represents an example of a diversion of the first aircraft within the peripheral lateral envelope of FIG. 5, according to the invention.

FIG. 6 shows an example of the discretization of transition line LT(K) into a plurality of transition points I0, I1, I2, . . . , I(N). In one particular implementation, the spacing between two adjacent transition points I0, I1, I2, . . . , I(N) is determined according to a predetermined time interval, similar to the one mentioned above for the width of each section TR0, TR1, TR2, . . . , TR(N).

Returning to FIG. 1, the calculation unit 140 is configured to determine for each transition point I0, I1, I2, . . . , I(N) of each transition line LT0, LT1, LT2, . . . , LT(N−1), using a conflict detection algorithm, a potential conflict between an avoidance path PNE and at least the second path PN2. In one implementation of the invention, only the second path PN2 which is associated with the second aircraft 40 is considered. In another implementation of the invention, a plurality of paths PN2, PN3, . . . , PN(N) associated with a plurality of aircraft located in the vicinity of the first path PN1 is considered. With this particular implementation, because the paths of the surrounding aircraft are considered, it is possible to resolve a potential conflict without creating another. However, in this implementation, only one path is considered per aircraft. But in one particular implementation, depending on the computing capacities available, one can take into account for each of the plurality of paths PN2, PN3, . . . , PN(N), a plurality of paths attainable by each of the aircraft. In this case, the device 100 can be used to determine this plurality of paths for each of the plurality of paths PN2, PN3, PN(N).

In the invention, the avoidance path PNE for each iteration is considered to comprise the current position of the first aircraft 30, the position of the current transition point, and a predetermined meeting point. In practice, the meeting point is determined by the air traffic controller.

FIG. 6 shows an example of an avoidance path PNE comprising the navigation point PR1 which corresponds to the current position of the aircraft 30. The avoidance path PNE also comprises the position of the current transition point I(K) of transition line LT(K). Finally, the avoidance path PNE comprises the position of navigation point PR4 which is the last navigation point of the first path PN1. However, as indicated above, the meeting point can be a navigation point PR that is different from the last navigation point PR4.

Returning to FIG. 6, during the next iteration, the next avoidance path PNE will comprise navigation point PR1, the position of transition point I(K+1) of transition line LT(K), and the position of navigation point PR4. And so on for each transition point in each transition line. In this capacity, note that for the execution of the calculation unit 140, a single current position of the aircraft 30 will be considered for the execution of all the iterations. Subsequently, during the next execution, the new current position of the aircraft 30 will be considered. And so on for each new execution of the calculation unit 140. It is thus understood that an execution of the calculation unit 140 enables the detection of a potential conflict, based on a current position of the first aircraft 30, between an avoidance path PNE and at least the second path PN2, for each transition point I0, I1, I2, . . . , I(N) of each transition line LT0, LT1, LT2, . . . , LT(N−1) of the current peripheral lateral envelope EV.

Regarding the conflict detection algorithm, using an algorithm of known type is envisaged, such as the one used in the tactical conflict detection tool of the Eurocontrol Experimental Center, as mentioned above. In practice, such an algorithm is based on the measurement, in the horizontal plane and for each time increment, of the distance between the avoidance path PNE and the second path PN2. Next, it is sufficient to compare the measured distance with a predetermined horizontal separation distance in order to determine whether a conflict will occur within the time increment considered. In the context of the operation of the TCT, it should be added that an analysis of the distance in the vertical plane supplements the detection in the horizontal plane.

In one particular implementation, the calculation unit 140 comprises a multi-core processor which is configured to execute the conflict detection algorithm. By means of such an arrangement, it is possible to perform all of the conflict determination calculations in parallel.

Returning to FIG. 1, the calculation unit 140 is also configured to calculate at least one outline of a conflict avoidance surface, from a plurality of transition point positions for which the conflict detection algorithm has not determined a potential conflict between the respective avoidance path PNE and the at least second path PN2.

Figure 7A:
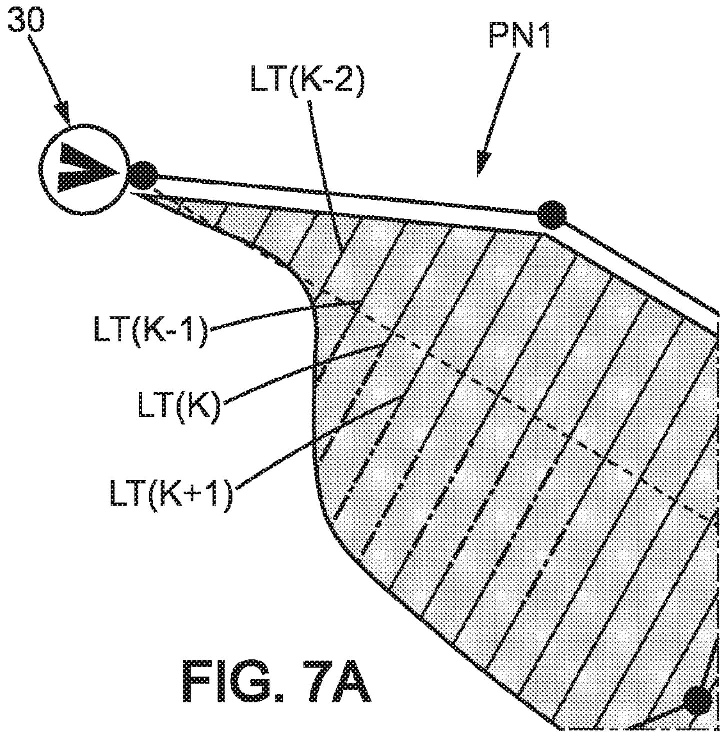
FIG. 7A represents an evaluation of the possible diversions from FIG. 6, according to the invention.

FIG. 7A shows, with a combination of dots and dashes, portions of transition lines LT0, LT1, LT2, . . . , LT(N−1) for which certain transition points I0, I1, I2, . . . , I(N) are comprised in avoidance paths PNE which are not in potential conflict with the second path PN2. In contrast, the portions of transition lines LT0, LT1, LT2, . . . , LT(N−1) which are solid lines correspond to the set of transition points I0, I1, I2, . . . , I(N) which would be in potential conflict with the second path PN2, if an avoidance path PNE passed through one of them.

Figure 7B:
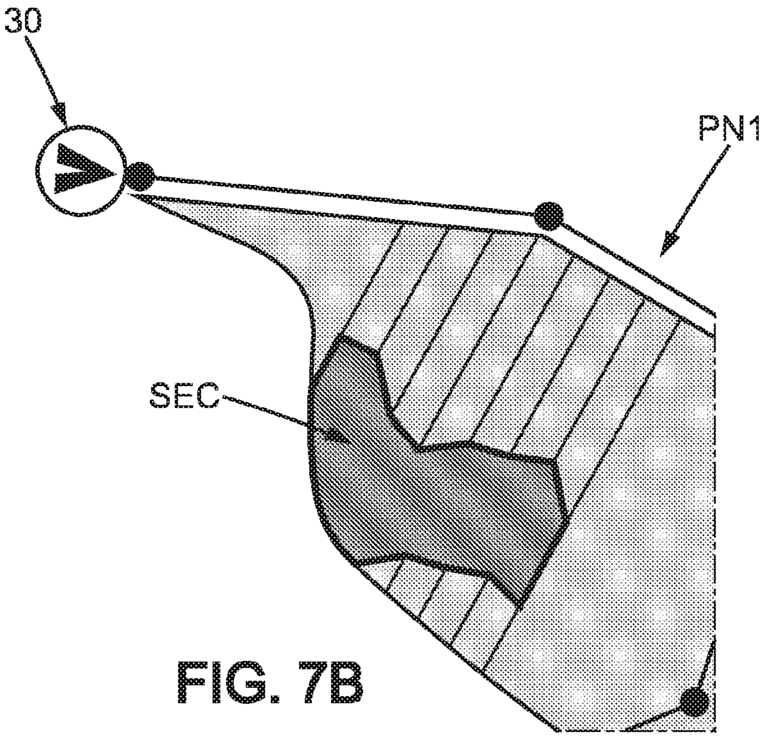
FIG. 7B represents a conflict avoidance surface obtained from FIG. 7A, according to the invention.

FIG. 7B shows a conflict avoidance surface SEC whose outline has been calculated from the transition points identified in FIG. 7A.

Figure 8:
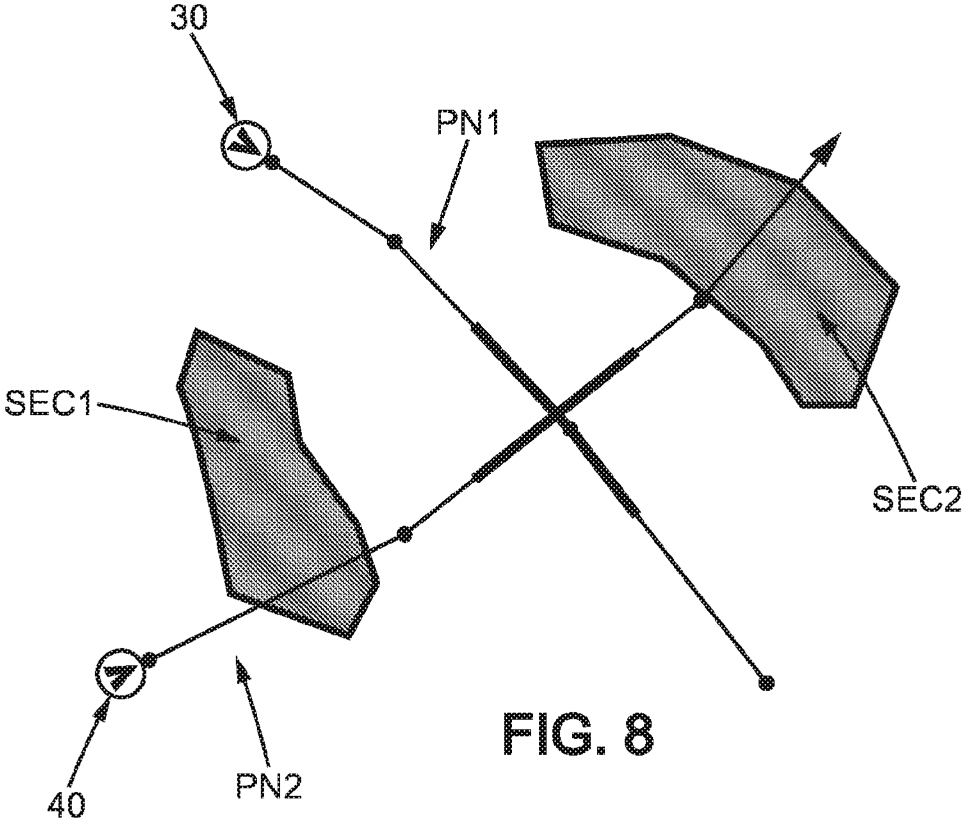
FIG. 8 represents two conflict avoidance surfaces obtained from FIG. 3, according to the invention.

With the conflict avoidance surfaces SEC as illustrated in FIG. 7B or more generally in FIG. 8, the air traffic control is informed that the diversion of the first aircraft 30 into one of these conflict avoidance surfaces SEC will allow it to avoid the potential conflict initially anticipated. Whatever avoidance path is chosen by the air traffic controller, if it passes through an avoidance point of SEC, then this will be a path without conflict with any other aircraft. In cases where there is no conflict avoidance zone SEC for an aircraft being considered, the information would be communicated to the air traffic controller so that he can take this into account in his resolution process.

In one particular implementation, the conflict avoidance surfaces SEC can be represented in a graphical interface presented to the air traffic controller in real time.

Figure 9:
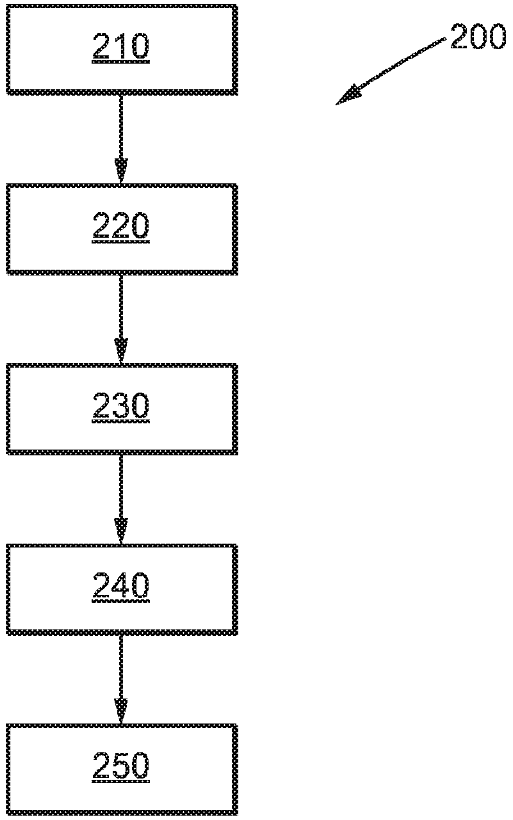
FIG. 9 represents a flowchart of a method according to the invention.

FIG. 9 illustrates a method 200 according to the invention. The method 200 makes it possible to provide assistance in avoiding a potential conflict detected within a predetermined path-prediction horizon, between the first path PN1 and the second path PN2.

The method 200 consists first of all of determining, in step 210, at least one peripheral lateral envelope EV, as indicated above.

Then, in step 220, the peripheral lateral envelope EV is divided into a longitudinal plurality of adjacent sections TR0, TR1, TR2, . . . , TR(N) next to one another and delineated by transition lines LT0, LT1, LT2, . . . , LT(N−1), as indicated above.

Furthermore, in step 230, each transition line LT0, LT1, LT2, . . . , LT(N−1) is discretized into a plurality of transition points I0, I1, I2, . . . , I(N), as indicated above.

Subsequently, in step 240, using a conflict detection algorithm, a potential conflict between an avoidance path PNE and at least the second path PN2 is determined for each transition point I0, I1, I2, . . . , I (N) of each transition line LT0, LT1, LT2, . . . , LT (N−1), as indicated above.

Finally, in step 250, at least one outline of a conflict avoidance surface SEC is calculated, as indicated above.

In one implementation of the method 200, the peripheral lateral envelope EV is determined from the performance characteristics of the first aircraft 30, as indicated above.

In an exemplary implementation of the method 200, in step 210, a right peripheral lateral envelope EV1 and a left peripheral lateral envelope EV2 are determined, as indicated above.

In one particular embodiment of the method 200, the transition lines LT0, LT1, LT2, . . . , LT(N−1) are rectilinear lines or arcs, as indicated above.

In another particular embodiment of the method 200, step 240 is carried out using a multi-core processor.

The invention has been described and illustrated in the present detailed description and in the figures. However, the invention is not limited to the embodiments presented. Other variants and embodiments can be deduced and implemented by a person skilled in the art upon reading this description and the appended figures.

For example, the method 200 may be implemented using hardware and/or software elements. It may in particular be implemented as a computer program comprising instructions for its execution. It may also be implemented in the Tactical Controller Tool (TCT) of the Eurocontrol Experimental Center. The computer program may be stored on a processor-readable storage medium. The medium may be electronic, magnetic, optical, or electromagnetic.

In particular, the invention may be implemented by a device comprising a processor and a memory. The processor may be a generic processor, a specific processor, an application-specific integrated circuit (also known as ASIC), or a field-programmable gate array (also known as FPGA).

The device may use one or more dedicated electronic circuits or a general-purpose circuit. The technique of the invention may be carried out on a reprogrammable computing machine (a processor or a microcontroller for example) executing a program comprising a sequence of instructions or on a dedicated computing machine (for example, a set of logic gates such as an FPGA or ASIC, or any other hardware module).

According to one embodiment, the device comprises at least one computer-readable storage medium (RAM, ROM, EEPROM, flash memory or other memory technology, CD-ROM, DVD or other optical disc medium, magnetic cassette, magnetic tape, magnetic storage disk or other storage device, or other non-transient computer-readable storage medium) containing a computer program (i.e., several executable instructions) which, when executed on a processor or several processors, performs the functions of the embodiments of the invention, described above.

The invention claimed is:

1. A device for assisting an air or maritime traffic controller in avoiding a potential conflict, detected within a predetermined path-prediction horizon, between a first path of a first aircraft and a second path of a second aircraft or between a first path of a first vessel and a second path of a second vessel, each path being in accordance with a navigation plan and comprising a plurality of segments formed between a plurality of navigation points, the device comprising at least a processor and a memory, the device being configured to:

determine at least one peripheral lateral envelope of the first path, the peripheral lateral envelope defining a lateral navigation surface attainable by the first aircraft or by the first vessel from a current position of the first aircraft or of the first vessel, divide the peripheral lateral envelope into a longitudinal plurality of adjacent sections next to one another and delineated by transition lines marking the change of section, each transition line intersecting a segment of the first path at a first point of intersection, and an edge of the peripheral lateral envelope at a second point of intersection, discretize each transition line into a finite number of transition points, wherein the spacing between two adjacent transition points is determined according to a predetermined time interval, define, for each transition point, of each transition line, a finite number of avoidance paths each comprising a plurality of rectilinear segments which are formed between the current position of the first aircraft, the position of the current transition point, and a predetermined meeting point, and determine, for each transition point of each transition line, using a conflict detection algorithm, a potential conflict between the avoidance path defined for the respective transition point and the second path, wherein a potential conflict is detected when a horizontal separation distance between the avoidance path and the second path is less than a predetermined horizontal separation distance, and calculate at least one outline of a conflict avoidance surface, from a plurality of transition point positions for which the conflict detection algorithm has not determined a potential conflict between the respective avoidance path and the second path, the outline of conflict avoidance surface comprising portions of transition lines which transition points are not in potential conflict with the second path.

2. The device according to claim 1, wherein the determination unit determines the peripheral lateral envelope based on performance characteristics of the first aircraft or of the first vessel.

3. The device according to claim 1, wherein the determination unit determines the peripheral lateral envelope based on a maximum authorized delay related to the last navigation point of the navigation plan of the first path.

4. The device according to claim 1, wherein the determination unit determines a right peripheral lateral envelope and a left peripheral lateral envelope.

5. The device according to claim 1, wherein the transition lines are rectilinear lines or arcs for which the center is the first navigation point or the current position of the first aircraft.

6. The device according to claim 5, wherein, when the transition lines are rectilinear lines, said transition lines are perpendicular to a straight line connecting the current position of the first aircraft and the predetermined meeting point.

7. The device according to claim 1, for assisting an air traffic controller, further comprising a graphical interface capable of presenting the conflict avoidance surfaces to the air traffic controller in real time.

8. A method for assisting an air or maritime traffic controller in avoiding a potential conflict, detected within a predetermined path-prediction horizon, between a first path of a first aircraft and a second path of a second aircraft or between a first path of a first vessel and a second path of a second vessel, each path being in accordance with a navigation plan and comprising a plurality of segments formed between a plurality of navigation points, the method being implement by a computing device comprising at least a processor and a memory, the method comprising the following steps:

determining at least one peripheral lateral envelope of the first path, the peripheral lateral envelope defining a lateral navigation surface attainable by the first aircraft or by the first vessel from a current position of the first aircraft or of the first vessel, dividing the peripheral lateral envelope into a longitudinal plurality of adjacent sections next to one another and delineated by transition lines marking the change of section, each transition line intersecting a segment of the first path at a first point of intersection, and an edge of the peripheral lateral envelope at a second point of intersection, discretizing each transition line into a finite number of transition points, wherein the spacing between two adjacent transition points is determined according to a predetermined time interval, defining, for each transition point, of each transition line, a finite number of avoidance paths each comprising a plurality of rectilinear segments which are formed between the current position of the first aircraft, the position of the current transition point, and a predetermined meeting point, and determining for each transition point of each transition line, using a conflict detection algorithm, a potential conflict between the avoidance path defined for the respective transition point and the second path, wherein a potential conflict is detected when a horizontal separation distance between the avoidance path and the second path is less than a predetermined horizontal separation distance (D), and calculating at least one outline of a conflict avoidance surface, from a plurality of transition point positions for which the conflict detection algorithm has not determined a potential conflict between the respective avoidance path and the second path, the outline of conflict avoidance surface comprising portions of transition lines which transition points are not in potential conflict with the second path.

9. The method according to claim 8, further comprising the determination of the peripheral lateral envelope based on performance characteristics of the first aircraft or of the first vessel.

10. The method according to claim 8, further comprising the determination of a right peripheral lateral envelope and a left peripheral lateral envelope.

11. The method according to claim 8, wherein the transition lines are rectilinear lines or arcs for which the center is the first navigation point or the current position of the first aircraft.

12. The method according to claim 11, wherein, when the transition lines are rectilinear lines, said transition lines are perpendicular to a straight line connecting the current position of the first aircraft and the predetermined meeting point.

* * * * *